(12) United States Patent
Chang

(10) Patent No.: US 12,019,831 B2
(45) Date of Patent: Jun. 25, 2024

(54) TOUCH-SENSING CIRCUIT AND TOUCH-JUDGING METHOD

(71) Applicant: NUVOTON TECHNOLOGY CORPORATION, Hsinchu (TW)

(72) Inventor: Pao-Shu Chang, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 18/340,825

(22) Filed: Jun. 23, 2023

(65) Prior Publication Data

US 2024/0143116 A1 May 2, 2024

(30) Foreign Application Priority Data

Oct. 27, 2022 (TW) .................................. 111140809

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC .... G06F 3/04166; G06F 3/044; G06F 3/0412; G06F 3/0416; G06F 3/04164; G06F 3/04184; G09G 2354/00; G09G 3/3216; G09G 2310/067; G09G 3/20; H10K 59/17; H10K 59/40
See application file for complete search history.

(56) References Cited

U.S. PATENT DOCUMENTS

2019/0095032 A1\* 3/2019 Park ...................... G06F 3/0446
2021/0055860 A1\* 2/2021 Kim ....................... G06F 3/0421

\* cited by examiner

*Primary Examiner* — Insa Sadio
(74) *Attorney, Agent, or Firm* — Snyder, Clark, Lesch & Chung, LLP

(57) ABSTRACT

A touch-sensing circuit and a touch-judging method are provided. The touch-sensing circuit controls the charging process or the discharging process of a sensing capacitor by a charge-discharge control unit. The first comparator and the second comparator are connected to the sensing capacitor to compare whether the voltage level of the sensing capacitor is higher than the preset high voltage or lower than the preset low voltage. The crossing detection unit receives the output pulse of the comparator and samples the first duration before the output pulse has a state transition and the second duration after the output pulse has the state transition. When the second duration is greater than the first duration, a switching signal is sent to the charge-discharge control unit to switch between the charging and discharging processes.

10 Claims, 7 Drawing Sheets

TOUCH-SENSING CIRCUIT AND
TOUCH-JUDGING METHOD

CROSS-REFERENCE TO RELATED
APPLICATION

This application claims priority from Taiwan Patent Application No. 111140809, filed on Oct. 27, 2022, in the Taiwan Intellectual Property Office, the content of which is hereby incorporated by reference in its entirety for all purposes.

BACKGROUND OF THE INVENTION

1. Field of the Invention

The present disclosure relates to a touch-sensing circuit and a touch-judging method, particularly a touch-sensing circuit and a judging method thereof which correctly judge touch operation without being affected by noise that causes misjudgment.

2. Description of the Related Art

Touch sensing units would be disposed on the touch interface of an electronic device, and the input or operation of the electronic device is achieved through judging a user's touch operation is identified. Touch sensing devices at present determine whether a user's touch operation is identified by detecting the voltage change of the sensing capacitor and measuring the charge-discharge cycle of the sensing capacitor through a counter. Please refer to FIG. 1A, which is a schematic diagram of monitoring of a conventional touch-sensing circuit. As shown in the figure, the voltage of the sensing capacitor would gradually increase during the charging process until the preset high voltage Vh is reached, the discharging process is switched to gradually decrease the voltage of the sensing capacitor until the preset low voltage Vl is reached, and the charging process is switched back again. A cycle of a charging process and a discharging process is calculated with the use of a counter to determine whether the touch sensing device has a touch operation. In an actual state, the charge-discharge cycle detected by the counter without the touch operation is n clock signals; since n is smaller than the set threshold, no touch operation is determined. In contrast, when the user touches a specific position, the sensing capacitor of the position touched by the user's finger would increase, thus increasing the cycle time of the charging and discharging processes (as shown by the dotted lines). Therefore, the charge-discharge cycle detected by the counter is m clock signals, and when m is greater than the set threshold, it is determined that this position is touched by the user.

However, the operation of other components of the electronic device or the effects of the external environment would generate unexpected noise that affects the voltage detection of sensing capacitors, as the sensing capacitor shown in figure that would have voltages rising or falling suddenly. For instance, during the charging process, the voltage rises suddenly at the first time point a1 due to noise and exceeds the preset high voltage Vh, making the touch-sensing device switch states to perform the discharging process; the voltage suddenly falls at the second time point a2 due to noise and reaches the preset low voltage Vl, making the charging process switched back again. At the moment, the charge-discharge cycle captured by the counter is n1 clock signals, which has a considerable error with the actual state of m clock signals; if n1 is less than the set threshold, an error judgment of no touch operation would occur. The n2 clock signals obtained later may also have the same situation, which makes it impossible to obtain the correct charge-discharge cycle time for the touch-sensing device in an actual state of touching, thus affecting the accuracy of judgment.

To solve the aforementioned problem, a conventional solution is to design a debounce mechanism to remove noise; that is, the voltage of the sensing capacitor must be above the preset high voltage Vh or below the preset low voltage Vl for a preset period of time, so that the switching condition for charging and discharging processes is considered to be reached. As shown in the figure, the voltage rises suddenly at the first time point a1 due to noise, but the voltage would return to the original level as soon as the noise disappears; at this moment, it is not determined that the voltage has reached the preset value in the charging process, so the charging process continues until the voltage along the waveform in dotted lines rises to the preset high voltage Vh; in addition, after a period of the debounce time td, the charging process is determined to have reached the preset value, which then performs the switching of the charging and discharging processes to avoid early switching that affects the calculation of the charge-discharge cycle. In contrast, in the discharging process, it is also possible to switch between the charging and discharging processes after the voltage has fallen below the preset low voltage Vl for a period of time longer than the debounce time td.

Although the mechanism of the debounce time can solve noise problems, error problems may still remain unsolved if noise occurs frequently. Please refer to FIG. 1B, which is a schematic diagram of the reset of the debounce mechanism for a conventional touch-sensing circuit. As shown in the figure, when the voltage of the sensing capacitor is close to the preset high voltage Vh during the charging process, the preset voltage would be determined after the voltage exceeds the preset high voltage Vh and after the debounce time td through the debounce mechanism, and then the discharging process is switched. However, in an actual situation, noise occurs frequently, such as the first noise N1, the second noise N2, the fourth noise N4, the fifth noise N5, and the seventh noise N7 causing sudden voltage falls, and the third noise N3 and the sixth noise N6 causing sudden voltage rises. When the voltage of the sensing capacitor exceeds the preset high voltage Vh, the debounce counter starts to calculate the period of the debounce time td; however, the fourth noise N4, fifth noise N5, and seventh noise N7 cause the voltage to fall below the preset high voltage Vh that makes the debounce counter to reset and restart the calculation of the debounce time td, thus causing a delay at the starting time. Such a time delay would delay the switching time of the charging and discharging processes and increase the overall time of the charge-discharge cycle; if the time for delay is too long, the threshold may be surpassed, leading to the misjudgment as a touch operation. The figure illustrates the charging process close to the preset high voltage Vh, and the same problem occurs when the discharging process is close to the preset low voltage Vl; therefore, the debounce mechanism still cannot completely solve the problem of error judgment caused by noise.

Accordingly, the inventor of the present disclosure has designed a touch-sensing circuit and a touch-judging method in an effort to tackle deficiencies in the prior art and further enhance the implementation and application in industries.

SUMMARY OF THE INVENTION

According to the problems in prior art, the purpose of the present disclosure is to provide a touch-sensing circuit and a touch-judging method, so as to avoid the problem of noise being misjudged as a touch signal that would cause the electronic device to operate incorrectly.

Based on the above, the present disclosure provides a touch-sensing circuit, including a charge-discharge control unit, a sensing capacitor, a first comparator, a second comparator, a crossing detection unit, a timing counter, and a touch judgment unit. Wherein, the charge-discharge control unit is connected to the current source, the sensing capacitor is connected to the charge-discharge control unit. The charge-discharge control unit is configured to control the charging process or the discharging process of the sensing capacitor. The first comparator is connected to the sensing capacitor and is configured to compare whether the voltage level of the sensing capacitor during the charging process is higher than the preset high voltage. The second comparator is connected to the sensing capacitor and is configured to compare whether the voltage level of the sensing capacitor during the discharging process is lower than the preset low voltage. The crossing detection unit is connected to the first comparator, the second comparator, and the charge-discharge control unit, and is configured to receive an output pulse of one of the first comparator and the second comparator, wherein the crossing detection unit samples a first duration before the output pulse has a state transition and samples a second duration after the output pulse has the state transition, and when the second duration is greater than the first duration, the crossing detection unit sends a switching signal to the charge-discharge control unit to switch between the charging process and the discharging process. The timing counter is connected to the charge-discharge control unit and is configured to calculate the charge-discharge cycle of the charging process and the discharging process. The touch judgment unit is connected to the timing counter and is configured to compare the charge-discharge cycle with the preset touch cycle to determine whether the sensing capacitor is touch operation.

Preferably, the crossing detection unit may include a sampling counter which samples the output pulse to calculate the first duration and the second duration, and a sampling frequency of the sampling counter is higher than a counting frequency of the timing counter.

Preferably, the state transition of the output pulse may be that the output pulse is changed from a high level to a low level, or that the output pulse is changed from the low level to the high level.

Preferably, when the second duration is greater than a preset duration, the crossing detection unit may send the switching signal to the charge-discharge control unit.

Preferably, the crossing detection unit may calculate times of occurrences that the second duration is greater than the first duration, and when the times of occurrences is greater than a preset value, the crossing detection unit sends the switching signal to the charge-discharge control unit.

Based on the above, the present disclosure provides a touch-judging method for a touch-sensing circuit, the touch-sensing circuit includes a charge-discharge control unit, a sensing capacitor, a first comparator, a second comparator, a crossing detection unit, a timing counter and a touch judgment unit. The touch-judging method includes the following steps: disposing the touch-sensing circuit, and controlling a charging process or a discharging process of the sensing capacitor by the charge-discharge control unit; comparing whether a voltage level of the sensing capacitor during the charging process is higher than a preset high voltage, by the first comparator, and comparing whether the voltage level of the sensing capacitor during the discharging process is lower than a preset low voltage, by the second comparator; when the voltage level of the sensing capacitor during the charging process is higher than the preset high voltage or the voltage level of the sensing capacitor during the discharging process is lower than the preset low voltage, sampling a first duration before the output pulse has a state transition and a second duration after the output pulse has the state transition, and determines whether the second duration is greater than the first duration, by the crossing detection unit; when the second duration is greater than the first duration, sending a switching signal to the charge-discharge control unit by the crossing detection unit, to switch between the charging process and the discharging process; calculating a charge-discharge cycle of the charging process and the discharging process, by the timing counter; and comparing the charge-discharge cycle and a preset touch cycle to determine whether the sensing capacitor is a touch operation, by the touch judgment unit.

Preferably, the crossing detection unit may include a sampling counter configured to sample the output pulse to calculate the first duration and the second duration, and a sampling frequency of the sampling counter is higher than a counting frequency of the timing counter.

Preferably, the state transition of the output pulse may be occurred when the output pulse is changed from a high level to a low level, or when the output pulse is changes from the low level to the high level.

Preferably, when the second duration is greater than a preset duration, the crossing detection unit sends the switching signal to the charge-discharge control unit.

Preferably, the crossing detection unit may calculate times of occurrences that the second duration is greater than the first duration, and when the times of occurrences is greater than a preset value, the crossing detection unit sends the switching signal to the charge-discharge control unit.

In light of the above, the touch-sensing circuit and the touch-judging method of the present disclosure may have one or more of the following advantages:

(1) For the touch-sensing circuit and the touch-judging method of the present disclosure, it may be determined whether the touch-sensing circuit is touch operation by monitoring the cycle time of the charging and discharging processes of the sensing capacitor. Moreover, the crossing detection unit is used to determine whether the voltage of the sensing capacitor has reached the preset high voltage or the preset low voltage to correctly determine the time point of switching between the charging and discharging processes. This makes the calculation of the charge-discharge cycle more accurate and prevents the noise from other components from affecting the calculation of the charge-discharge cycle, resulting in misjudgment of the touch operation.

(2) For the touch-sensing circuit and the touch-judging method of the present disclosure, through the proportion of the duration, it may be determined whether the voltage level of the sensing capacitor meets the standard of switching the charging and discharging processes, which is suitable for devices or environments with frequent noise and can solve the problem of the delayed starting time caused by the debounce mechanism at present.

(3) For the touch-sensing circuit and the touch-judging method of the present disclosure, through the setting of different judgment rules, the flexibility of operation may be enhanced, which is suitable for various conditions of noise occurrence. The effect of noise on the calculation of the charge-discharge cycle time may be removed to improve the accuracy of the judgment by the devices.

BRIEF DESCRIPTION OF THE DRAWINGS

To make the technical features, content, and advantages of the present disclosure and the achievable effects more obvious, the present disclosure is described together with the following figures.

DESCRIPTION OF THE PREFERRED EMBODIMENTS

To illustrate the technical features, contents, advantages, and achievable effects of the present disclosure, the embodiment together with the attached drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

Figure 2:
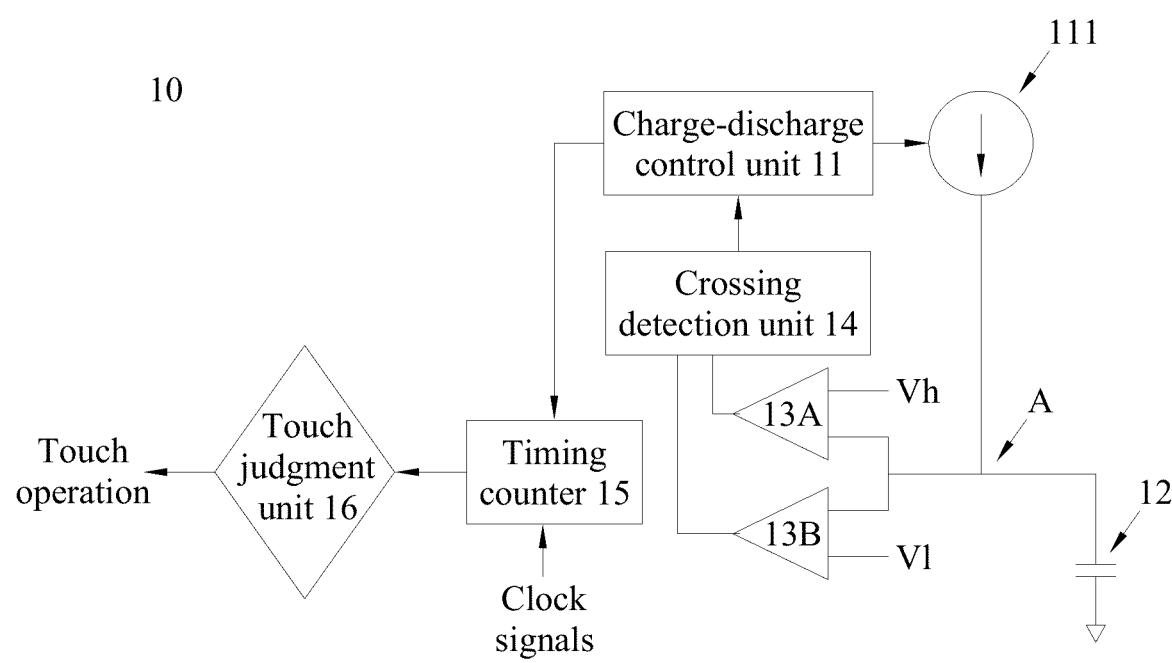
FIG. 2 is a schematic diagram of a touch-sensing circuit according to an embodiment of the present disclosure.

Please refer to FIG. 2, which is a schematic diagram of a touch-sensing circuit according to an embodiment of the present disclosure. As shown in the figure, the touch-sensing circuit 10 includes a charge-discharge control unit 11, a sensing capacitor 12, a first comparator 13A, a second comparator 13B, a crossing detection unit 14, a timing counter 15, and a touch judgment unit 16; in the present embodiment, each unit and the processing modules included therein may be implemented in the form of circuits or wafers. The charge-discharge control unit 11 is connected to the current source 111 and controls the current source 111 to provide electrical energy to perform a charging process or a discharging process on the sensing capacitor 12. The first comparator 13A and the second comparator 13B are connected to the sensing capacitor 12 through node A, and the voltage level of the sensing capacitor 12 is monitored through the first comparator 13A and the second comparator 13B. In the first comparator 13A, the two input terminals are respectively connected to node A and the voltage source of the preset high voltage Vh; the input voltage from node A is compared with the preset high voltage Vh inputted from the terminal of the reference voltage, and the comparison result is outputted to the output terminal; whether the voltage level of the sensing capacitor 12 is higher than the preset high voltage Vh may be detected through the first comparator 13A. In the second comparator 13B, the two input terminals are respectively connected to node A and the voltage source of the preset low voltage Vl; the input voltage from node A is compared with the preset low voltage Vl inputted from the terminal of the reference voltage, and the comparison result is outputted to the output terminal; whether the voltage level of the sensing capacitor 12 is lower than the preset low voltage Vl may be detected through the second comparator 13B.

When the voltage level of the sensing capacitor 12 rises to the preset high voltage Vh, the output pulse of the first comparator 13A is changed from a low level to a high level; when the voltage level falls below the preset high voltage Vh, the output pulse of the first comparator 13A is changed from the high level to the low level; the output pulse of the first comparator 13A having a state transition means that the output pulse is changed the state from the low level to the high level. When the voltage level of the sensing capacitor 12 falls to the preset low voltage Vl, the output pulse of the second comparator 13B is changed from the high level to the low level; when the voltage level rises above the preset low voltage Vl, the output pulse of the second comparator 13B is changed from the low level to the high level; the output pulse of the second comparator 13B having the state transition means that the output pulse is changed the state from the high level to the low level. The crossing detection unit 14 is connected to the first comparator 13A and the second comparator 13B, the output pulse of the first comparator 13A and the second comparator 13B is received by the crossing detection unit 14, and it is determined whether the standard of switching the charging and discharging processes is met through the condition of the state transition.

Figure 1A:
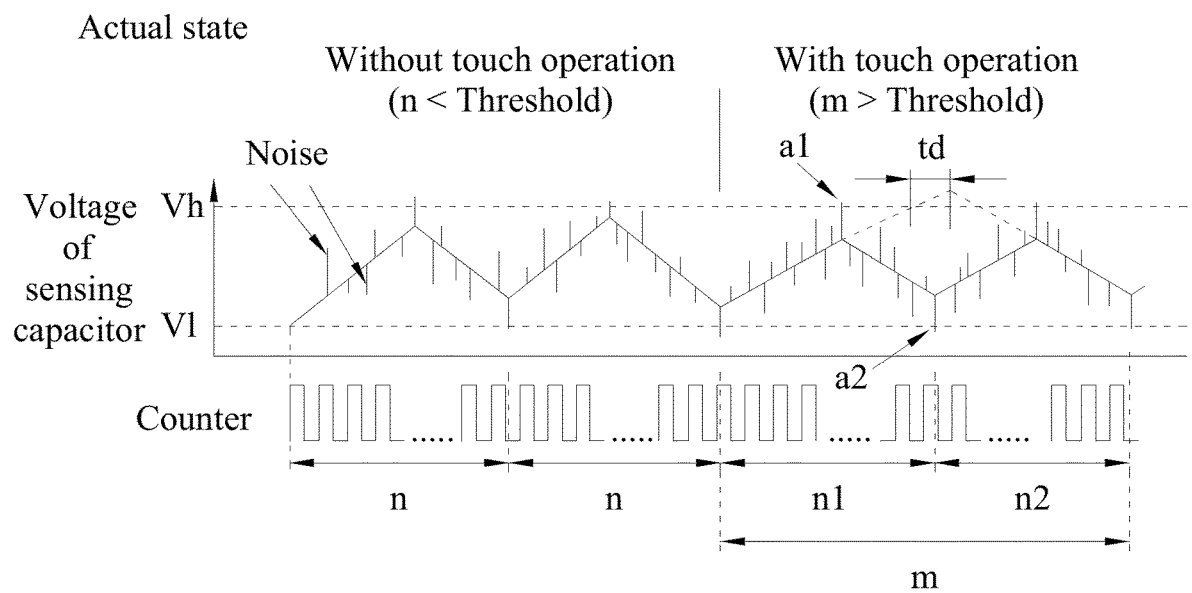
FIG. 1A is a schematic diagram of the monitoring of a conventional touch-sensing circuit.
Figure 1B:
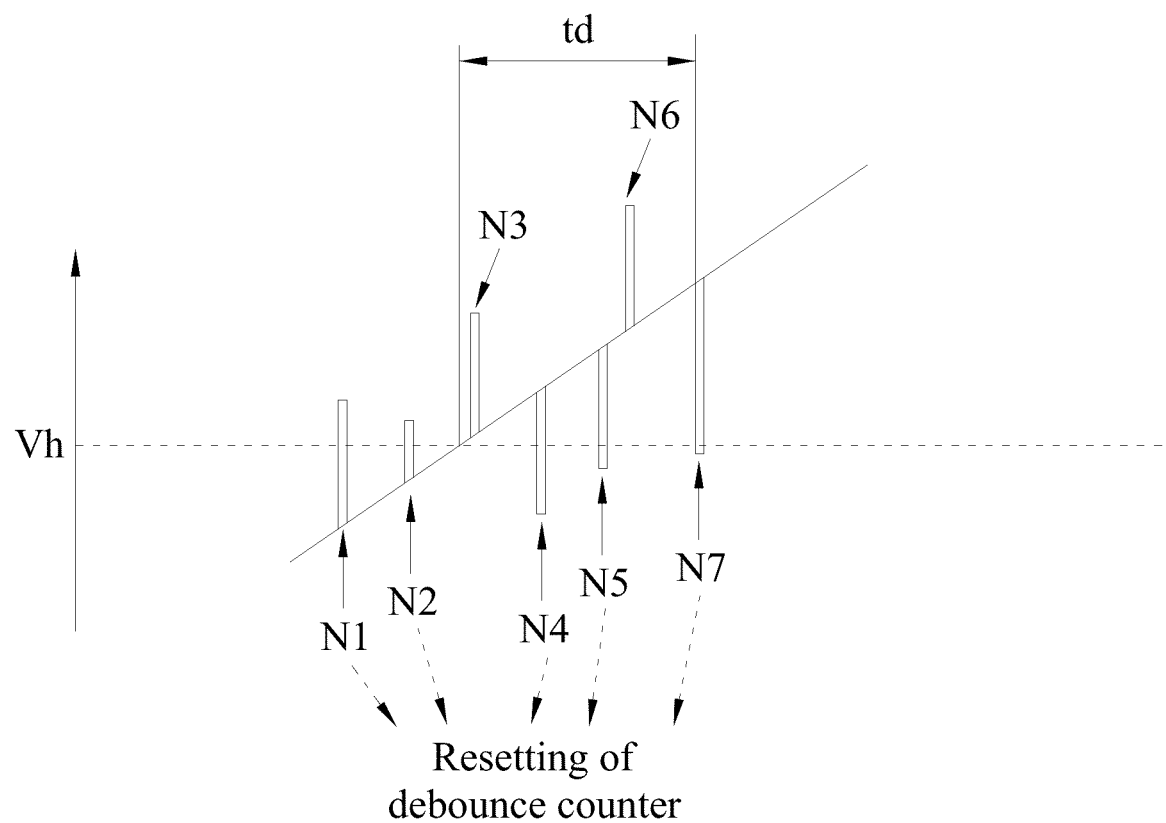
FIG. 1B is a schematic diagram of resetting the debounce mechanism of a conventional touch-sensing circuit.
Figure 3:
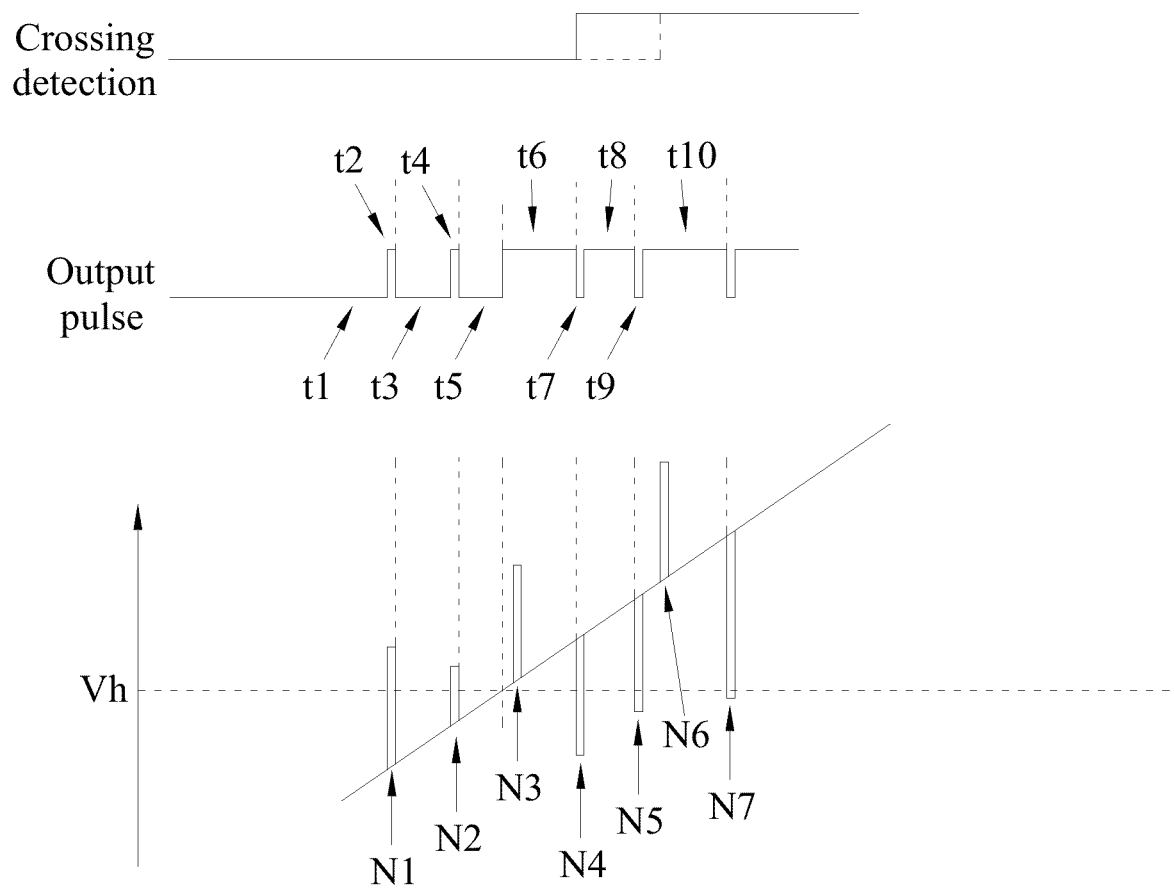
FIG. 3 is a schematic diagram of a waveform of the output pulse of the first comparator having a state transition according to an embodiment of the present disclosure.

Please refer to FIG. 3, which is a schematic diagram of a waveform of the output pulse of the first comparator having the state transition according to an embodiment of the present disclosure. Likewise, taking the state where noise occurs in FIG. 1B as an example, the voltage level of the sensing capacitor 12 is close to the preset high voltage Vh during the charging process; since other components of the electronic device may be operated simultaneously, such as playing sound, leading to frequent noise due to voltage changes; as shown in the figure, the first noise N1, the second noise N2, the fourth noise N4, the fifth noise N5, and the seventh noise N7 cause a sudden voltage drop, and the third noise N3 and the sixth noise N6 cause a sudden voltage rise. In the present embodiment, the crossing detection unit 14 samples to calculate the duration of the output pulse before and after the state transition occurs; that is, resampling may be performed when the state transition occurs to calculate the duration. Since the noise only causes a sudden rise or fall in voltage for a short period of time, by comparing the duration before and after, it may be determined whether the sensing capacitor has actually met the state of preset switching, thus removing the influence of noise on the switching time of the charging and discharging processes.

In FIG. 3, when the first noise N1 occurs, the voltage level of the sensing capacitor 12 suddenly exceeds the preset high voltage Vh, making the output pulse of the first comparator 13A change from the low level to the high level; the first state transition is generated, the first duration t1 before the state transition is recorded, and resampling is performed to calculate the duration after the state transition. As the noise disappears, the voltage level of the sensing capacitor 12 immediately falls below the preset high voltage Vh, making the output pulse change from the high level to the low level; thus, the second duration t2 recorded is much smaller than the first duration t1, which does not meet the actual switching standard. When the output pulse falls below the preset high voltage Vh, the crossing detection unit 14 continues to resample duration until being affected by the second noise N2 that makes the voltage suddenly rise above the preset high voltage Vh, followed by the occurrence of the state transition again. At this moment, the third duration t3 before the state transition occurs and the fourth duration after the state transition occurs are recorded. Similar to the first noise N1, although the second noise N2 makes the output pulse have the state transition, the fourth duration t4 after the state transition is significantly smaller than the third duration t3 before the state transition, so it is still considered to have not met the switching standard; the crossing detection unit 14 resets the detection process when the output pulse falls below the preset high voltage Vh and restarts to sample the duration before and after the state transition.

In the process of sampling duration, the voltage level of the sensing capacitor 12 reaches the preset high voltage Vh, making the output pulse change from the low level to the high level. The crossing detection unit 14 samples the fifth duration t5 before the state transition and samples the sixth duration t6 after the state transition. When the sixth duration t6 is greater than the fifth duration t5 (that is, the time proportion of the output pulse at the high level is higher than that at the low level), it may be determined that the voltage level of the sensing capacitor 12 reaches the preset high voltage Vh, and the charging process must be switched to the discharging process. The crossing detection unit 14 sends the switching signal to the charge-discharge control unit 11, and the charge-discharge control unit 11 controls the current source 111 to switch the sensing capacitor 12 from the charging process to the discharging process.

In the present embodiment, when the condition that the duration after the state transition is greater than the duration before the state transition occurs once (the sixth duration t6 is greater than the fifth duration t5), it is determined that the switching standard has been reached. However, the present embodiment is not limited thereto; in other embodiment, if noise occurs more frequently, it is possible to determine that the switching standard is met when the condition that the duration after the state transition is greater than the duration before the state transition occurs the number of times more than the preset value. For example, when the preset value is set to three times, which means that the sixth duration t6 is greater than the fifth duration t5, the eighth duration t8 is greater than the seventh duration t7, and the tenth duration t10 is greater than the ninth duration t9, it is determined that the switching standard is reached (as shown by the dotted line). The switching signal is sent to the charge-discharge control unit 11 through the crossing detection unit 14, and the switching of the charging and discharging processes of the sensing capacitor 12 is controlled through the charge-discharge control unit 11. In contrast, in the case of less significant noise, to avoid the delay caused by the continuous sampling of the crossing detection unit 14, preset duration may also be set, and when the duration of the sampling after the state transition exceeds the preset duration, it is determined that the switching standard is met. For example, after the state transition, the sixth duration t6 no longer occurs; after the sixth duration t6 reaches the preset duration, the sampling is stopped, and the switching standard is determined to be reached. Likewise, the switching signal is sent to the charging and discharging control unit 11 through the crossing detection unit 14, and the switching of the charging and discharging processes of the sensing capacitor 12 is controlled through the charge-discharge control unit 11.

FIG. 3 shows the state transition of the output pulse of the first comparator 13A, and the second comparator 13B is in an opposite condition to the first comparator 13A. During the discharging process, the voltage level of the sensing capacitor 12 continues to fall down. When the voltage level falls to the preset low voltage Vl, the output pulse of the second comparator 13B is changed from the high level to the low level; when the voltage level rises above the preset low voltage Vl, the output pulse of the second comparator 13B is changed from the low level to the high level. Likewise, in the environment with noise, the voltage level may fall to the preset low voltage Vl early, or after reaching the preset low voltage Vl, the voltage may return to above the preset low voltage Vl due to noise, causing difficulty in judgment. Therefore, Judgment standard similar to that of the first comparator 13A may also be applied to the second comparator 13B, which compares the duration before the state transition occurs with that after the state transition occurs; when the subsequent duration is greater than the previous duration, meaning that the time proportion of the output pulse at the low level is higher than that at the high level, it may be determined that the voltage level of the sensing capacitor 12 reaches the preset low voltage Vl, indicating that the discharging process must be switched to the charging process. In other embodiment, likewise, it is also possible to set the times of occurrences to be that the duration after the state transition is greater than the duration before the state transition; for example, the same condition occurs three times before it is determined that the switching standard is met.

Figure 4:
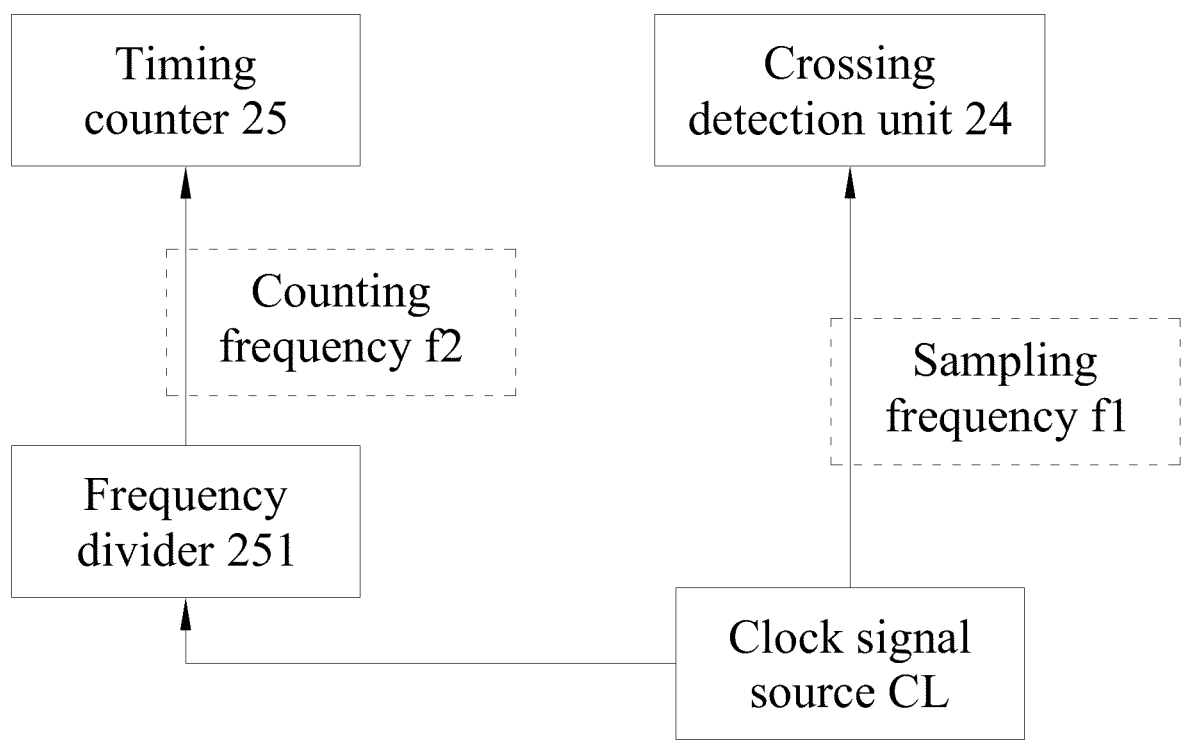
FIG. 4 is a schematic diagram of a crossing detection unit and a timing counter according to an embodiment of the present disclosure.

Referring to FIG. 2 again, after the completion of switching the charging process and discharging process, the charge-discharge control unit 11 completes the charge-discharge cycle of one charging process and one discharging process. Meanwhile, the timing counter 15 connected to the charge-discharge control unit 11 calculates the length of the charge-discharge cycle through clock signals, The time of the charge-discharge cycle obtained by the timing counter 15 is then sent to the touch judgment unit 16. Compared with the set preset touch cycle, when the charge-discharge cycle time exceeds the threshold of the preset touch cycle, it is determined that there is a touch operation to the sensing capacitor 12; in contrast, if the charge-discharge cycle time is below the threshold of the preset touch cycle, it is determined that there is no touch operation.

please refer to FIG. 4, which refer to a schematic diagram of a crossing detection unit and a timing counter according to an embodiment of the present disclosure. As shown in the figure, in the touch-sensing circuit, both the crossing detection unit 24 and the timing counter 25 need to perform time calculation through the provision of clock signals. As described in the aforementioned embodiment, due to the short time of noise occurrence, to sample the correct time of pulse change, the sampling frequency f1 required by the crossing detection unit 24 needs to be higher than the counting frequency f2 required by the timing counter 25. In the actual circuit design, a clock signal source CL with high-frequency may be set, and the clock signal source CL is connected to the crossing detection unit 24, which provides a sampling frequency f1 with high-frequency to detect changes in the output pulse. On the other hand, the clock signal source CL is connected to the frequency divider 251, which converts the clock signal with high frequency to a counting frequency f2 with lower frequency after frequency division, and the timing counter 25 is provided to detect the charge-discharge cycle time.

In the present embodiment, the crossing detection unit 24 and the timing counter 25 may be provided by the same clock signal source CL to provide clock signals, but the present disclosure is not limited to thereto. In other embodiment, the crossing detection unit 24 and the timing counter 25 may be connected to different clock signal sources, and required clock signal frequencies may be provided by different clock signal sources to complete the detection of the duration after the state transition and the detection of the charge-discharge cycle respectively.

Figure 5:
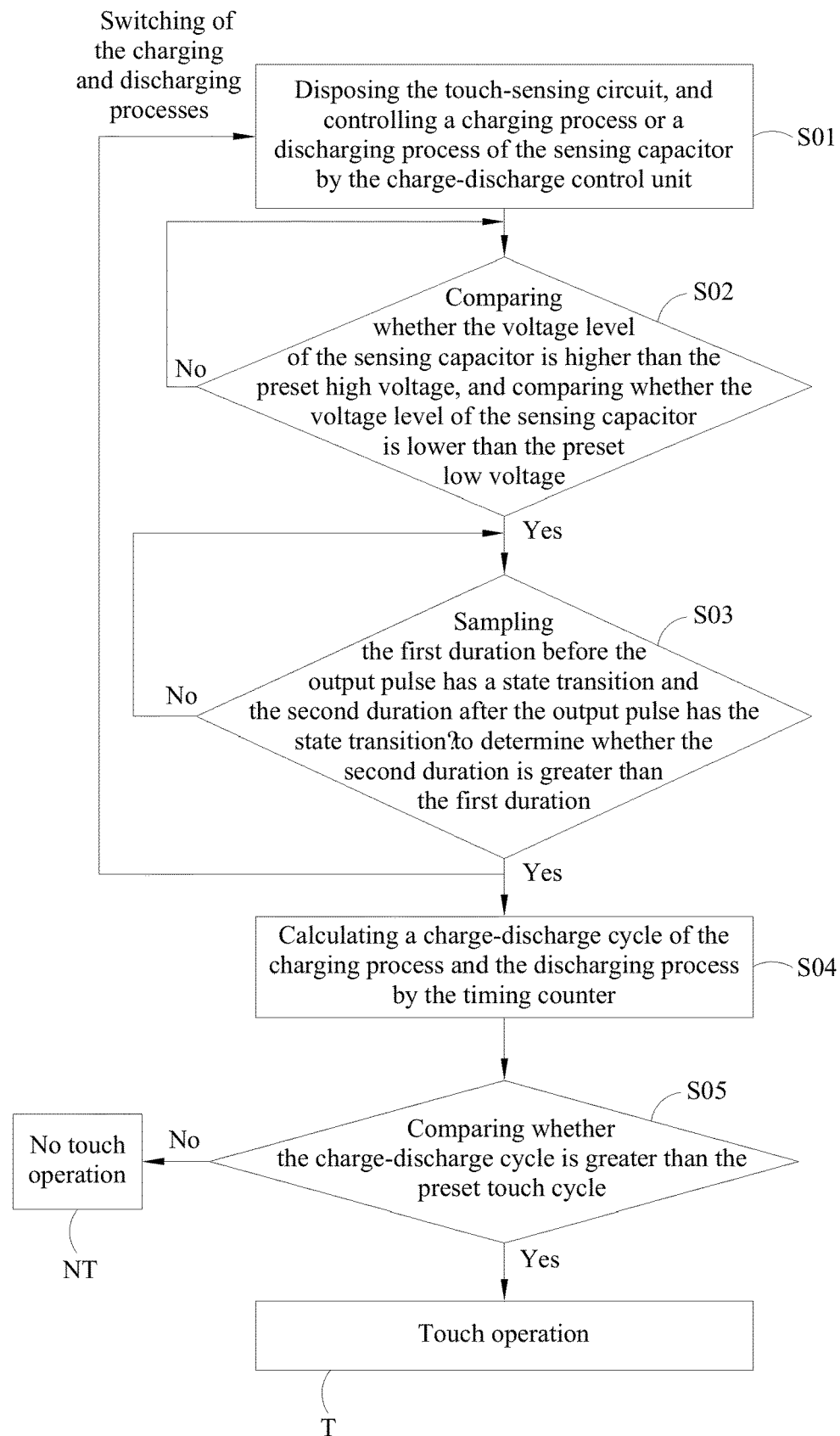
FIG. 5 is a flowchart of a touch-judging method according to an embodiment of the present disclosure.

Please refer to FIG. 5, which is a flowchart of a touch-judging method according to an embodiment of the present disclosure. The touch-judging method is applicable to the touch-sensing circuit of the aforementioned embodiment, and the touch-sensing circuit includes a charge-discharge control unit, a first comparator, a second comparator, a crossing detection unit, a timing counter, and a touch judgment unit. As shown in the figure, the touch-judging method includes the following steps (S01-S05).

Step S01: Disposing the touch-sensing circuit, and controlling a charging process or a discharging process of the sensing capacitor by the charge-discharge control unit. The touch-sensing circuit as described in the aforementioned embodiment is disposed, the charging process and discharging process of the sensing capacitor are performed by controlling the current source through the charge-discharge control unit, and the charge-discharge cycle are calculated to determine whether the sensing capacitor has a touch operation.

Step S02: Comparing whether the voltage level of the sensing capacitor is higher than the preset high voltage, and comparing whether the voltage level of the sensing capacitor is lower than the preset low voltage; if one of them being true, moving to step S03, and if not, continuing to monitor and compare. To calculate the charge-discharge cycle of the sensing capacitor, the sensing capacitor is connected to the first comparator and the second comparator to determine whether the voltage level of the sensing capacitor reaches the preset high voltage through the charging process and the preset low voltage through the discharging process respectively, so as to calculate the charge-discharge cycle through the time point of switching. The voltage level of the sensing capacitor and the preset high voltage are inputted to the first comparator; when the voltage level is higher than the preset high voltage, the output pulse of the first comparator is changed from the low level to the high level. The voltage level of the sensing capacitor and the preset low voltage are inputted to the second comparator; when the voltage level is lower than the preset low voltage, the output pulse of the second comparator is changed from the high level to the low level. When the output pulse is changed from the low level to the high level or from the high level to the low level, it is determined that the output pulse has the state transition; that is, the voltage level of the sensing capacitor has reached the preset high voltage or reached the preset low voltage, and then continue to step S03 to determine whether the switching standard has been met or whether it is only affected by noise. If the output pulse does not have the state transition, continue to monitor and compare until the state transition occurs.

Step S03: Sampling the first duration before the output pulse has a state transition and the second duration after the output pulse has the state transition to determine whether the second duration is greater than the first duration; If the state transition of the output pulse is truly the state transition, sending the switching signal to the charge-discharge control unit to switch between the charging process and the discharging process, and if the second duration is not greater than the first duration, continuing to sample. As described in the aforementioned embodiment, although the first comparator or second comparator of the previous step compares that the sensing capacitor has reached a preset high voltage or a preset low voltage, this may still be a sudden state influenced by noise. To obtain the correct time point of switching the charging and discharging processes without the influence of noise, the first duration before the pulse has the state transition and the second duration after the pulse has the state transition are sampled by the crossing detection unit, and whether the second duration is greater than the first duration is compared, so as to determine whether the voltage level of the sensing capacitor has truly reached the preset high voltage or preset low voltage, thereby determining whether it is the correct time point to switch between charging and discharging processes. If the voltage of the sensing capacitor truly reaches at the preset high voltage or preset low voltage, even if the state transition occurs again due to the influence of noise, the proportion of the duration thereof should be less than the duration after the noise disappears. Therefore, through the judgment of the length of the duration, it is confirmed whether the state transition of the output pulse is truly the state transition when the preset high voltage or preset low voltage is reached. When the state transition of the output pulse is truly the state transition, a switching signal is sent to the charge-discharge control unit by the crossing detection unit to switch between the charging process and the discharging process; if no, the state transition is regarded as the influence of noise, and the sampling is continued without sending the switching signal for the time being.

Step S04: Calculating a charge-discharge cycle of the charging process and the discharging process by the timing counter. After sending the switching signal to the charge-discharge control unit in the previous step, the timing counter connected to the charge-discharge control unit calculates the time of switching the charging process and discharging process through the time point of switching. The timing counter may be connected to the clock signal source and calculates the time of charging and discharging processes through the counting frequency of the clock signal, thus obtaining the time of the whole charge-discharge cycle. Both the timing counter and the crossing detection unit need to be connected to the clock signal source to retrieve the calculated time through the clock signal. Due to the short time of the noise sampled by the crossing detection unit, to correctly sample the effects caused by the noise, the sampling frequency of the clock signal used in the crossing detection unit is higher than the counting frequency of the timing counter.

Step S05: Comparing whether the charge-discharge cycle is greater than the preset touch cycle; if yes, determining the sensing capacitor as touch operation T; if no, determining the sensing capacitor as no touch operation NT. The charge-discharge cycle obtained from the previous step is sent to the touch judgment unit to compare whether the charge-discharge cycle is greater than the preset touch cycle; if yes, determining the sensing capacitor as touch operation T; if no, determining the sensing capacitor as no touch operation NT.

Figure 6:
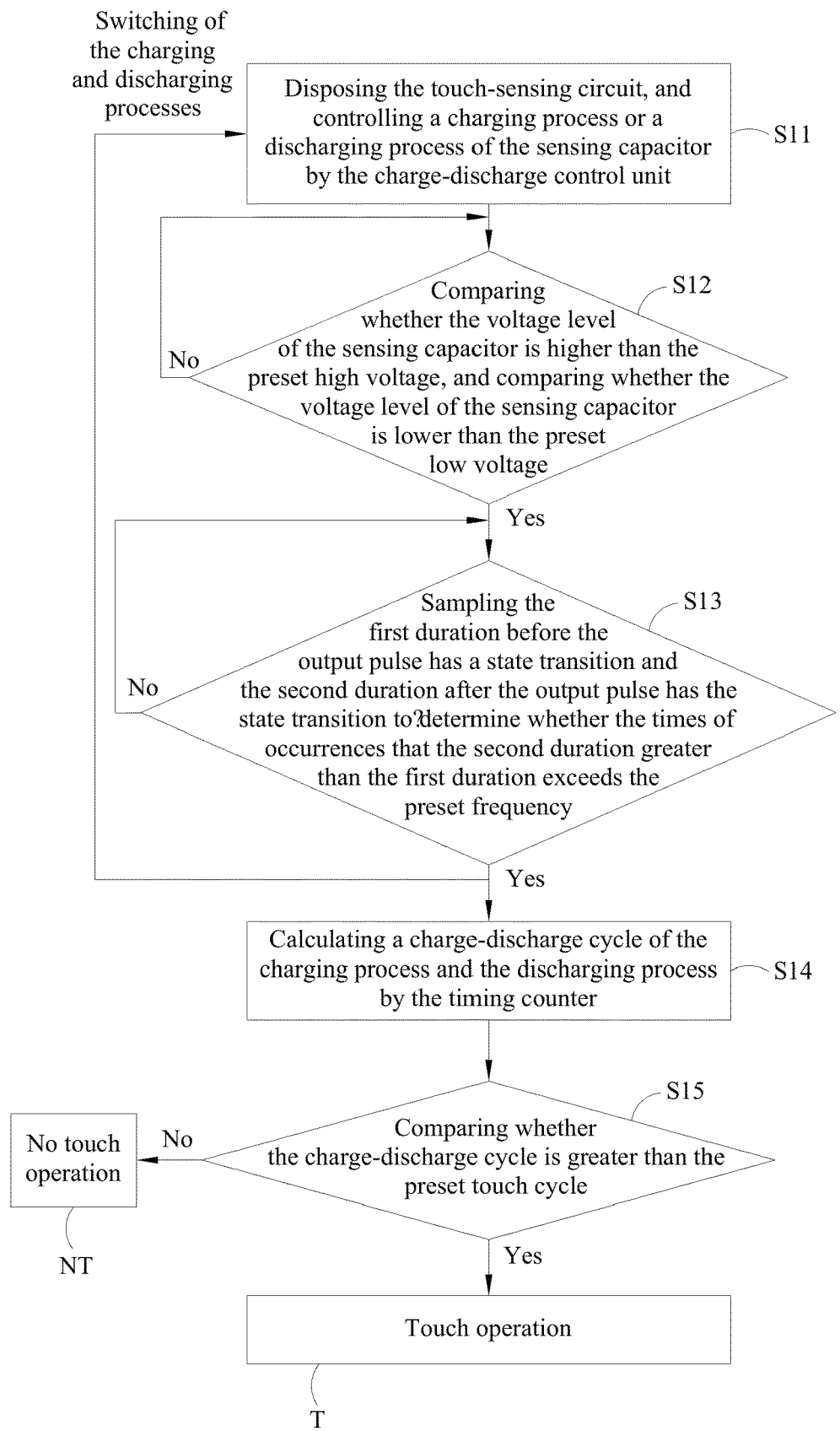
FIG. 6 is a flowchart of a touch-judging method according to another embodiment of the present disclosure.

Please refer to FIG. 6, which is a flowchart of a touch-judging method according to another embodiment of the present disclosure. The touch-judging method is applicable to the touch-sensing circuit of the aforementioned embodiment, and the touch-sensing circuit includes a charge-discharge control unit, a first comparator, a second comparator, a crossing detection unit, a timing counter, and a touch judgment unit. As shown in the figure, the touch-judging method includes the following steps (S11-S15).

Step S11: Disposing the touch-sensing circuit, and controlling a charging process or a discharging process of the sensing capacitor by the charge-discharge control unit. The touch-sensing circuit as described in the aforementioned embodiment is disposed, the charging process and discharging process of the sensing capacitor are performed by controlling the current source through the charge-discharge control unit, and the charge-discharge cycle are calculated to determine whether the sensing capacitor has a touch operation.

Step S12: Comparing whether the voltage level of the sensing capacitor is higher than the preset high voltage, and comparing whether the voltage level of the sensing capacitor is lower than the preset low voltage; if one of them being true, moving to step S13, and if not, continuing to monitor and compare. The sensing capacitor is connected to the first comparator and the second comparator respectively, and the voltage level of the sensing capacitor and the preset high voltage are inputted to the first comparator; when the voltage level reaches the preset high voltage, the output pulse of the first comparator is changed from the low level to the high level. The voltage level of the sensing capacitor and the preset low voltage are inputted to the second comparator; when the voltage level reaches the preset low voltage, the output pulse of the second comparator is changed from the high level to the low level. When the output pulse is changed from the low level to the high level or from the high level to the low level, it is determined that the output pulse has the state transition; that is, the voltage level of the sensing capacitor has reached the preset high voltage or reached the preset low voltage; if the state transition occurs, continue to step S13 to determine whether the switching standard has been met or whether it is only affected by noise. When the output pulse does not have state transition, continue to monitor and compare.

Step S13: Sampling the first duration before the output pulse has a state transition and the second duration after the output pulse has the state transition to determine whether the times of occurrence that the second duration greater than the first duration exceeds the preset value; If the state transition of the output pulse is truly the state transition, sending the switching signal to the charge-discharge control unit to switch between the charging process and the discharging process, and if the times of occurrence does not exceed the preset value, continuing to sample. To obtain the correct time point of switching the charging and discharging processes without the influence of noise, the first duration after the pulse has the state transition and the second duration after the pulse has another state transition after the first duration are sampled through the crossing detection unit. Unlike the previous embodiment, in this step, in addition to determining whether the second duration is greater than the first duration, the times of occurrences that the second duration is greater than the first duration is also calculated; when the times of occurrences is greater than the preset value, it is confirmed that the state transition of the output pulse truly reaches the preset high voltage or the preset low voltage. For example, after three times of judgement which confirms that the preset high voltage or preset low voltage is reached, the switching signal is sent from the crossing detection unit to the charge-discharge control unit to switch between the charging process and the discharging process; If the times of occurrence does not exceed three times, continue to sample until the times of occurrences reaches the preset value.

Step S14: Calculating a charge-discharge cycle of the charging process and the discharging process by the timing counter. After sending the switching signal to the charge-discharge control unit in the previous step, the timing counter connected to the charge-discharge control unit calculates the time of switching the charging process and discharging process through the time point of switching. The timing counter may be connected to the clock signal source and calculate the time of the charging and discharging processes through the counting frequency of the clock signal to obtain the time of the whole charge-discharge cycle. Both the timing counter and the crossing detection unit need to be connected to the clock signal source to retrieve the calculated time through the clock signal. Due to the short time of the noise sampled by the crossing detection unit, to correctly sample the effects caused by the noise, the sampling frequency of the clock signal used in the crossing detection unit is higher than the counting frequency of the timing counter.

Step S15: Comparing whether the charge-discharge cycle is greater than the preset touch cycle; if yes, determining the sensing capacitor as touch operation T; if no, determining the sensing capacitor as no touch operation NT. The charge-discharge cycle obtained from the previous step is sent to the touch judgment unit to compare whether the charge-discharge cycle is greater than the preset touch cycle; if yes, determining the sensing capacitor as touch operation T; if no, determining the sensing capacitor as no touch operation NT.

The above description is merely illustrative rather than restrictive. Any equivalent modifications or alterations without departing from the spirit and scope of the present disclosure are intended to be included in the following claims.

What is claimed is:

1. A touch-sensing circuit, comprising:
   a charge-discharge control unit, connected to a current source;
   a sensing capacitor, connected to the charge-discharge control unit, wherein the charge-discharge control unit is configured to control a charging process or a discharging process of the sensing capacitor;
   a first comparator, connected to the sensing capacitor and configured to compare whether a voltage level of the sensing capacitor in the charging process is higher than a preset high voltage;
   a second comparator, connected to the sensing capacitor and configured to compare whether the voltage level of the sensing capacitor in the discharging process is lower than a preset low voltage;
   a crossing detection unit, connected to the first comparator, the second comparator and the charge-discharge control unit and configured to receive an output pulse of one of the first comparator and the second comparator, wherein the crossing detection unit samples a first duration before the output pulse has a state transition and samples a second duration after the output pulse has the state transition, and when the second duration is greater than the first duration, the crossing detection unit sends a switching signal to the charge-discharge control unit to switch between the charging process and the discharging process;
   a timing counter, connected to the charge-discharge control unit and configured to calculate a charge-discharge cycle of the charging process and the discharging process; and
   a touch judgment unit, connected to the timing counter and configured to compare the charge-discharge cycle and a preset touch cycle to determine whether the sensing capacitor is a touch operation.

2. The touch-sensing circuit according to claim 1, wherein the crossing detection unit comprises a sampling counter which samples the output pulse to calculate the first duration and the second duration, and a sampling frequency of the sampling counter is higher than a counting frequency of the timing counter.

3. The touch-sensing circuit according to claim 1, wherein the state transition of the output pulse is that the output pulse is changed from a high level to a low level, or that the output pulse is changed from the low level to the high level.

4. The touch-sensing circuit according to claim 1, wherein when the second duration is greater than a preset duration, the crossing detection unit sends the switching signal to the charge-discharge control unit.

5. The touch-sensing circuit according to claim 1, wherein the crossing detection unit calculates times of occurrences that the second duration is greater than the first duration, and when the times of occurrences is greater than a preset value, the crossing detection unit sends the switching signal to the charge-discharge control unit.

6. A touch-judging method for a touch-sensing circuit, the touch-sensing circuit comprising a charge-discharge control unit, a sensing capacitor, a first comparator, a second comparator, a crossing detection unit, a timing counter, and a touch judgment unit, wherein the touch-judging method comprises:

disposing the touch-sensing circuit, and controlling a charging process or a discharging process of the sensing capacitor by the charge-discharge control unit;

comparing whether a voltage level of the sensing capacitor during the charging process is higher than a preset high voltage, by the first comparator, and comparing whether the voltage level of the sensing capacitor during the discharging process is lower than a preset low voltage, by the second comparator;

when the voltage level of the sensing capacitor during the charging process is higher than the preset high voltage or the voltage level of the sensing capacitor during the discharging process is lower than the preset low voltage, sampling a first duration before the output pulse has a state transition and a second duration after the output pulse has the state transition, and determining whether the second duration is greater than the first duration, by the crossing detection unit;

when the second duration is greater than the first duration, sending a switching signal to the charge-discharge control unit by the crossing detection unit, to switch between the charging process and the discharging process;

calculating a charge-discharge cycle of the charging process and the discharging process, by the timing counter; and comparing the charge-discharge cycle and a preset touch cycle to determine whether the sensing capacitor is a touch operation, by the touch judgment unit.

7. The touch-judging method according to claim 6, wherein the crossing detection unit comprises a sampling counter configured to samples the output pulse to calculate the first duration and the second duration, and a sampling frequency of the sampling counter is higher than a counting frequency of the timing counter.

8. The touch-judging method according to claim 6, wherein the state transition of the output pulse is occurred when the output pulse is changed from a high level to a low level, or when the output pulse is changed from the low level to the high level.

9. The touch-judging method according to claim 6, wherein when the second duration is greater than a preset duration, the crossing detection unit sends the switching signal to the charge-discharge control unit.

10. The touch-judging method according to claim 6, wherein the crossing detection unit calculates times of occurrences that the second duration is greater than the first duration, and when the times of occurrences is greater than a preset value, the crossing detection unit sends the switching signal to the charge-discharge control unit.

* * * * *